April 6, 1926. 1,580,075

E. E. PAINE

AUTOMOBILE RUNNING BOARD

Filed August 13, 1923

INVENTOR.
Enoch E. Paine

BY
Jay, Oberlin & Jay
ATTORNEYS

Patented Apr. 6, 1926.

1,580,075

UNITED STATES PATENT OFFICE.

ENOCH E. PAINE, OF CLEVELAND, OHIO, ASSIGNOR TO THE PAINE & WILLIAMS COMPANY, OF CLEVELAND, OHIO, A CORPORATION OF OHIO.

AUTOMOBILE RUNNING BOARD.

Application filed August 13, 1923. Serial No. 657,071.

*To all whom it may concern:*

Be it known that I, ENOCH E. PAINE, a citizen of the United States, and a resident of Cleveland, county of Cuyahoga, and State of Ohio, have invented a new and useful Improvement in Automobile Running Boards, of which the following is a specification, the principle of the invention being herein explained and the best mode in which I have contemplated applying that principle, so as to distinguish it from other inventions.

The present invention, relating, as indicated, to automobile running boards, has more particular regard to the provision on such boards or on steps and the like elsewhere of an improved tread surface. One object of the invention is the provision of a sheet of rubber which constitutes the tread proper with a corrugated surface of special design, and another object is the provision of improved means for securing such a sheet of rubber onto the board or other supporting surface.

To the accomplishment of the foregoing and related ends, the invention, then, consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

Figure 1:
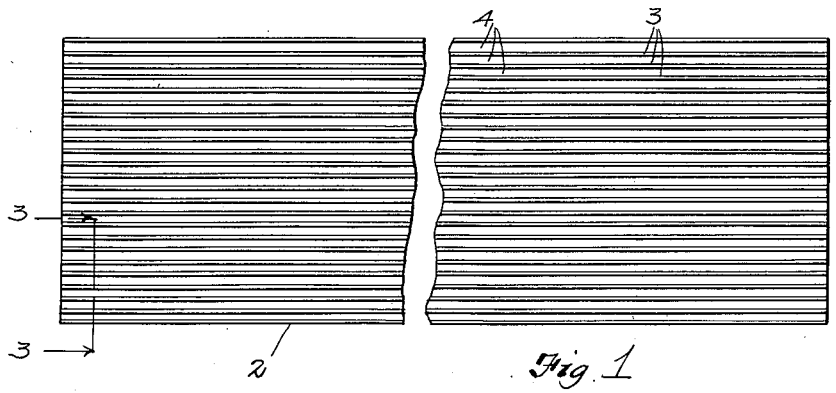
Figure 2:
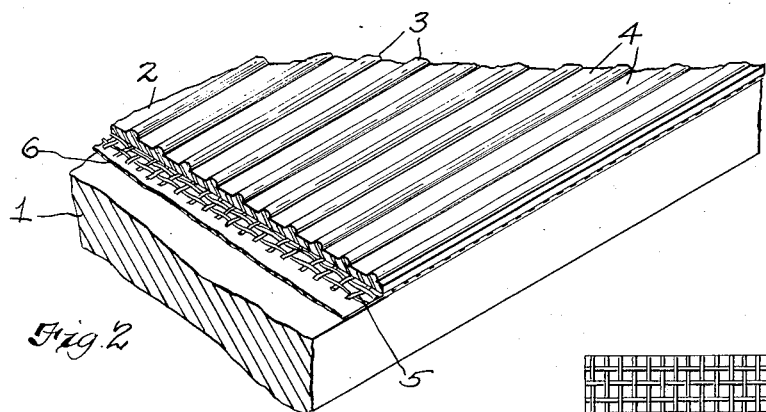
Figure 3:
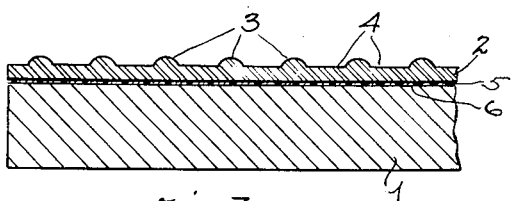

Fig. 1 is a broken plan view of a running board provided with my improved tread; Fig. 2 is a broken perspective view of the same on a larger scale and showing the component parts that enter into the structure; Fig. 3 is a transverse section, the plane of the section being indicated by the line 3—3, Fig. 1; and Fig. 4 is a bottom plan view of the tread element or sheet.

The running board 1, as shown in Figs. 2 and 3, may be either an actual board or it may consist of a sheet of metal or like material adapted to form a step, or in other words carry a tread surface. The tread proper, as previously indicated, consists of a sheet 2 of rubber or rubber-like material of suitable thickness to constitute a mat when applied to the support 1. The upper surface of such sheet is corrugated, the corrugations 3 lying parallel with each other and extending longitudinally of the major dimension of the sheet, or in other words transversely of the direction in which the sheet will be crossed when trod upon. These corrugations are suitably spaced to leave clear, flat intervals 4 therebetween, and as best shown in Fig. 3, more or less sharply defined corners are left between the ribs and such flat surface of the sheet. The actual size and proportions of the corrugations or ribs and the body portion of the rubber sheet are shown in Fig. 2 of the drawing. It will be noted that the ribs have a maximum width of more than twice their maximum height, and that the thickness of the body portion between the ribs is less than the width of the ribs. The ribs are spaced from each other a distance of about one and one-half times their maximum width, and the upper surface of each of said ribs presents a continuously curved area meeting the flat surface of the sheet in more or less sharply defined corners, as stated above. These relative proportions of the several elements of the rubber sheet have been found through numerous tests to provide for the maximum amount of durability and safety in service upon automobile running boards, and at the same time to present the most pleasing appearance, while calling for a relatively small amount of material as compared with the usual commercial forms of rubber matting.

Figure 4:
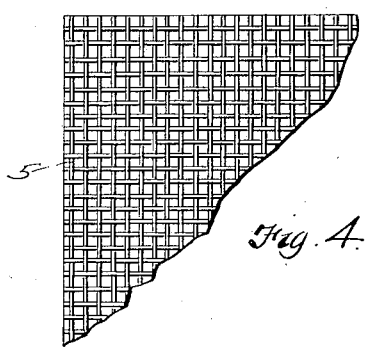

In the manufacture of the sheet, a backing 5 of burlap, or equivalent coarse stranded and coarsely woven fabric, is firmly attached to the under surface of the sheet, being in fact partially embedded in such sheet but not wholly so, with the result that the surface retains the reticulated appearance illustrated in Fig. 4, the fibers in part lying above the surface of the rubber sheet proper.

In applying the sheet to the support, a layer 6 of glue or cement is interposed, the particular glue or cement selected being one that is adapted to adhere to the surface of the support 1. Such glue or cement, however, thus selected will not necessarily adhere readily to rubber, but by reason of the fibrous material, specifically the sheet 5 of loosely woven burlap, embedded in the under surface of the matting 2, the latter is nevertheless held firmly adherent to the support.

A running board equipped with my improved tread is measurably superior to one merely covered with linoleum or like floor covering material such as has heretofore been used, not only in wearing quality but also in durability and general appearance. Furthermore, by securing a firm bond between the tread sheet proper and the support in the manner hereinbefore described, all danger of the tread separating or becoming loose in places is eliminated.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In an automobile running board or like tread, the combination of a thin flexible molded rubber mat adapted to be applied to the tread surface of a suitable supporting base, the upper side of said mat being corrugated transversely of the direction in which it will be crossed when trod upon, and a sheet of fabric partially embedded in the under side of said mat, whereby a layer of cementing material interposed between such tread surface and mat is adapted to make a firm bond therebetween.

2. In an automobile running board, or like tread, the combination with a supporting base, of a thin, wholly flexible, molded rubber mat applied to the tread surface of such base, the upper side of said mat being corrugated transversely of the direction in which it will be crossed when trod upon, said corrugations presenting rounded ribs spaced from each other a distance greater than the maximum width of an individual rib and forming sharply defined corners along the lines of their juncture with the flat surface of the sheet, each rib being of uniform height and curvature throughout its length, a sheet of burlap partially embedded in the under side of said mat, and a layer of cementing material interposed between said base and mat and adapted to make a firm bond with the material of said base and said burlap.

Signed by me, this 6th day of August, 1923.

ENOCH E. PAINE.